(12) United States Patent
Dean et al.

(10) Patent No.: US 12,005,348 B2
(45) Date of Patent: Jun. 11, 2024

(54) GAME DELIVERY SYSTEM

(71) Applicant: Immersive Group Gaming Ltd, London (GB)

(72) Inventors: William Thomas Dean, London (GB); Thomas James Arnott, London (GB); Jan Breens, London (GB)

(73) Assignee: Immersive Group Gaming LTD, London (GB)

( * ) Notice: Subject to any disclaimer, the term of this patent is extended or adjusted under 35 U.S.C. 154(b) by 70 days.

(21) Appl. No.: 17/447,918

(22) Filed: Sep. 16, 2021

(65) Prior Publication Data
US 2022/0401832 A1    Dec. 22, 2022

(30) Foreign Application Priority Data
Jun. 17, 2021    (GB) .................................... 2108686

(51) Int. Cl.
*A63F 13/352*    (2014.01)
*A63F 13/213*    (2014.01)
(Continued)

(52) U.S. Cl.
CPC .......... *A63F 13/352* (2014.09); *A63F 13/213* (2014.09); *A63F 13/2145* (2014.09); *A63F 13/31* (2014.09); *A63F 13/48* (2014.09); *G06F 3/0488* (2013.01); *G06Q 10/02* (2013.01); *H04L 67/10* (2013.01); *H04L 67/141* (2013.01); *A63F 2300/1025* (2013.01); *A63F 2300/1075* (2013.01); *A63F 2300/1087* (2013.01);
(Continued)

(58) Field of Classification Search
CPC ........ A63F 13/352; A63F 13/48; A63F 13/35; A63F 13/79; G06Q 10/02
See application file for complete search history.

(56) References Cited

U.S. PATENT DOCUMENTS 7,278,920 B1 * 10/2007 Klamer ................... A63F 13/30
463/31
7,938,727 B1 * 5/2011 Konkle ................... A63F 13/92
715/764

(Continued)

FOREIGN PATENT DOCUMENTS

EP          3007074 A1    4/2016
WO    WO 2016/204904 A1    12/2016

OTHER PUBLICATIONS

Anonymous, Electric Gamebox, Play Immersive Team Adventures, Immersive Group Gaming, May 12, 2021, 84 pages, Retrieved from the Internet: URL:http://web.archive.org/web/20210512142857/ https://electricgamebox.com/.

(Continued)

*Primary Examiner* — Chase E Leichliter
(74) *Attorney, Agent, or Firm* — Knobbe, Martens, Olson & Bear, LLP

(57) ABSTRACT

Systems and methods are disclosed for delivering a requested game experience at any of multiple distributed venues. Each venue can include respective gameplay areas and multimedia gaming equipment for delivering a game experience in each gameplay area. The system can include a booking system for managing game bookings across the venues and a master central server configured to generate game sessions based on bookings at the booking system.

19 Claims, 12 Drawing Sheets

(51) Int. Cl.
   *A63F 13/2145*   (2014.01)
   *A63F 13/31*     (2014.01)
   *A63F 13/48*     (2014.01)
   *G06F 3/0488*    (2022.01)
   *G06Q 10/02*     (2012.01)
   *H04L 67/10*     (2022.01)
   *H04L 67/141*    (2022.01)
   *H04L 9/40*      (2022.01)

(52) U.S. Cl.
   CPC ... *A63F 2300/513* (2013.01); *A63F 2300/636* (2013.01); *H04L 63/04* (2013.01)

(56) References Cited

U.S. PATENT DOCUMENTS

| | | | | |
|---|---|---|---|---|
| 8,360,876 B2* | 1/2013 | Imachi | ............... | G07F 17/3295 463/19 |
| 9,100,629 B1* | 8/2015 | Brenden | ............... | G06F 3/14 |
| 9,101,836 B1* | 8/2015 | Brenden | ............... | A63F 13/86 |
| 11,097,186 B1* | 8/2021 | Hickman | ............ | A63F 13/5378 |
| 2001/0055991 A1* | 12/2001 | Hightower | ............ | A63F 13/48 463/41 |
| 2007/0155488 A1* | 7/2007 | Kubota | ............... | A63F 13/48 463/29 |
| 2008/0108438 A1* | 5/2008 | Sugiyama | ........... | G07F 17/3276 463/42 |
| 2009/0098935 A1* | 4/2009 | Jack | ............... | G07F 17/3227 463/29 |
| 2009/0186700 A1* | 7/2009 | Konkle | ............... | G06Q 10/10 463/42 |
| 2011/0195790 A1* | 8/2011 | Konkle | ............... | A63F 13/92 463/36 |
| 2012/0190452 A1* | 7/2012 | Weston | ............... | A63F 13/323 463/39 |
| 2013/0045804 A1* | 2/2013 | Ruke | ............... | A63F 13/79 463/40 |
| 2014/0364225 A1* | 12/2014 | Konkle | ............... | A63F 13/79 463/31 |
| 2015/0134377 A1* | 5/2015 | Flahive | ............... | G06Q 10/02 705/5 |
| 2015/0209666 A1* | 7/2015 | Harris | ............... | A63F 13/27 463/31 |
| 2015/0297996 A1* | 10/2015 | Konkle | ............... | H04L 9/40 463/31 |
| 2015/0306498 A1* | 10/2015 | Törnqvist | ............ | A63F 13/215 463/36 |
| 2015/0352451 A1* | 12/2015 | Brenden | ............... | H04L 51/52 463/31 |
| 2016/0038834 A1 | 2/2016 | Walker | | |
| 2016/0279509 A1* | 9/2016 | Miller | ............... | A63F 13/26 |
| 2016/0375361 A1* | 12/2016 | Brenden | ............... | A63F 13/48 463/31 |
| 2017/0232340 A1* | 8/2017 | Lockton | ............... | H04L 65/1094 463/42 |
| 2017/0264961 A1* | 9/2017 | Lockton | ............... | A63F 13/338 |
| 2018/0280794 A1* | 10/2018 | Brenden | ............ | H04N 21/4122 |
| 2018/0361235 A1* | 12/2018 | Hunter | ............... | H04L 67/5681 |
| 2019/0143204 A1* | 5/2019 | Aman | ............... | A63F 13/50 463/31 |
| 2019/0217186 A1 | 7/2019 | Atli et al. | | |
| 2019/0321727 A1 | 10/2019 | Rodgers | | |
| 2020/0030697 A1* | 1/2020 | Mueller | ............... | A63F 13/77 |
| 2021/0263484 A1* | 8/2021 | Rutstein | ............... | G06Q 10/109 |
| 2022/0398799 A1* | 12/2022 | DuPlessie | ............... | E04H 3/10 |
| 2022/0401832 A1* | 12/2022 | Dean | ............... | G06Q 10/02 |

OTHER PUBLICATIONS

International Search Report and Written Opinion for Application No. PCT/EP2022/056394 dated Jul. 4, 2022, 14 pages.

\* cited by examiner

| Game | Gameboard 1 | Rule Set 1 | Gameboard 2 | Rule Set 2 |
|---|---|---|---|---|
| Psychedelic Mansion | PMG1 | PMR1 | PMG1 | PMR2 |
| Alien Aptitude Test | AATG1 | AATR1 | AATG2 | AATR2 |
| Rescue the Royals | RRG1 | RRR1 | RRG2 | RRR1 |
| Ticket to Mars | TMG1 | TMR1 | TMG2 | TMR2 |
| Temple of Coins | TCG1 | TCR1 | TCG2 | TCR2 |

300

| Time | Room | Session ID | Gameboards | Game Rule Sets |
|---|---|---|---|---|
| 11:00 | 1 | AB12 | AATG1; AATG2 | AATR1; AATR2 |
| 11:00 | 2 | CD15 | RRG1; RRG2 | RRR1; RRR2 |
| 11:30 | 3 | XY52 | RRG1; RRG2 | RRR1; RRR2 |
| 12:00 | 1 | FG42 | TMG1; TMG2 | TMR1; TMR2 |
| 12:15 | 3 | JK90 | PMG1; PMG2 | PMR1; PMR2 |

Figure 8

| Selected Element | Action | Score |
|---|---|---|
| First tile | Flip selected tile | 0 |
| Matching tile | Flip selected tile; turn both tiles green; remove both tiles from game environment | 10 |
| Non-matching tile | Flip selected tile; turn both tiles red; flip both tiles | -5 |

GAME DELIVERY SYSTEM

TECHNICAL FIELD

The present disclosure relates to a game delivery computer system for delivering a requested game experience to one or more users (players).

BACKGROUND

As computer gaming increases in popularity, the range of available gaming modalities continues to increase. "Personal gaming" generally refers to games which a user (or users) plays on their own personal device, such as a mobile device, personal computer, games console etc. On the other hand, "venue gaming" can offer a more unique gaming experience at a specially-designed venue. In this case, a user typically books a game session at their chosen time and venue. Gaming venues can be adapted to provide a more immersive and engaging user experience, using a complex and sophisticated arrangement of multimedia equipment that would not be viable for most individual users to own and operate. For example, each venue might provide a suite of "interactive digital rooms" (or "game boxes"), in which images are projected onto the walls, and touch screens, motion tracking and surround sound are used to create highly immersive gaming experience.

SUMMARY

Venue-based interactive gaming opens up many possibilities. However, there are specific technical challenges that arise when managing multiple, geographically distributed gaming venues in a way that ensures a consistent and reliable experience across all venues.

According to a first aspect herein a distributed computer system for delivering a requested game experience at any venue of a plurality of distributed venues comprises:
  at each venue: a plurality of local units serving respective gameplay areas of the venue, each local unit coupled to a set of multimedia gaming equipment for delivering a game experience in its gameplay area, and a venue central unit configured to connect to each of the local units of that venue;
  a booking system for managing game bookings across the plurality of distributed venues, the booking system configured to receive, from a user device, a booking request denoting a requested venue of the plurality of distributed venues, and create a booking in response; and
  a master central server configured to connect to the session management system and the venue central unit of each venue;
  wherein the master central server is configured to generate a game session based on the booking, and automatically communicate the game session to the venue central unit of the requested venue, wherein the venue central unit receiving the game session is configured render accessible, to the local unit serving one of the gameplay areas, game details of the game session, and wherein that local unit is configured to deliver the requested game experience within that gameplay area, using its set of multimedia gaming equipment, based on the game details of the game session.

Accordingly, in the present architecture, a user can create a booking, e.g. via an online booking web page. Normally such systems would only be used to record booking and make details of those bookings available to venue staff. However, in the present architecture, a game session is automatically generated based on the booking and passed from the master central server to each venue central unit, which in turn is renders the game details accessible to the applicable local unit to initiate the game. The flow from the booking system to the local unit in control of the multimedia equipment is essentially automated, requiring no or minimal human oversight. The present architecture is highly scalable, and does not require technically skilled venue staff at each venue.

In embodiments, the venue central unit may be configured to store the game session in a venue session database of the requested venue, and the master central server may be configured to duplicate the game session in a master session database.

The master central server may be configured to retain control of the game session initially and, whilst in control of the game session, propagate any changes to the game session to the venue central unit of the requested venue for replicating in the venue session database. Responsive to a venue control event, the venue central unit may be configured to assume control of the game session, and, whilst in control of the game session, propagate any changes in the game session to the master central server for replicating in the master session database.

The local unit may be configured to augment the game session with gameplay data.

The venue central unit may be configured, whilst in control of the game session, to pass control of the game session to the local unit in response to a game initiation event. The local unit may be configured to: initiate the game experience responsive thereto, augment the game session with gameplay data whilst in control of the game session, and pass control of the augmented game session back to the venue central unit upon termination of the game experience.

The venue central unit may be configured to automatically communicate the augmented game session to the master central server.

The master central server may be configured to store the augmented game session in the master session database and assume control of the augmented game session thereafter.

The game session may comprise at least one user address, and the master central server may be configured to automatically send at least a portion of the gameplay data from the augmented game session to the user address.

The portion of the gameplay data of the augmented game session may comprise image data captured by the local unit from the gameplay area during the gameplay experience.

The venue control event may be the expiration of a time limit set by a booking time of the booking session.

The game initiation event may be the receipt of a game initiation instruction at the local unit from a venue management device.

The booking system may be configured to store the booking in a booking database, and the master central server may be configured, whilst in control of the game session, to modify the game session in the master database based on a change in the booking, and communicate the modified game session to the local unit for storing in the venue session database.

Each venue central unit may have a session management interface, and the venue central unit of the requested venue may be configured to initiate the delivery of the game experience by the local unit in response to a game initiation instruction received at the session management interface.

The session management interface may be accessible to a venue management device via a private network of the venue, the game initiation instruction received from the venue management device via the private network.

The game initiation instruction may denote the gameplay area to which the gameplay session is to be transferred, or the game session may comprise an identifier of the gameplay area which the gameplay session is to be transferred.

The master central server may be configured to access the booking via a first application programming interface of the booking system, and the master central server may be configured to provide a second application programming interface, accessible to each of the venue central units, via which the game session is communicated.

The master central server may comprise a control system for controlling operations of the venue central unit via control messages sent via push channels from the central server to the venue central units.

The distributed computer system may comprise a game management system for creating and/or modifying games held in a master game database, wherein the master central server is configured to automatically communicate a new or updated game to all of the venue central units. Each venue central unit may be configured to store a venue copy of the central game database. The game details of the game session may identify one of the games and the game experience may be delivered by executing the identified game on the local unit.

For example, the game details may comprise a game identifier used to locate a game application in a venue game database, and program instructions (code) of the located game application may be loaded into execution memory of the local unit for delivering the game experience. The game session may be populated with the game identifier based on a game selection receive with or after the booking request (but will not necessarily be visible to the booking system), from the user device or another user device authorized to provide that information.

Each set of multimedia gaming equipment may comprise: a display system configured to render a real or virtual moving image on at least one display screen in the gameplay area, and at least one input device for receiving user input. Each local unit may be configured to update the real moving image responsive to the user input in order to deliver the game experience.

The at least one input device may comprise at least one image capture device for tracking user motion detected in the gameplay area, the user input comprising user motion detected in the gameplay area, and/or at least one touch detection device for detecting touch input at the display screen, the user input comprising tough input detected at the display screen.

The booking request may be received from the user device at the booking system via public network.

Further aspects herein provides computer program code for programming a distributed computer system to implement the above functions and components, and a computer-implemented method carried out by executing the same.

BRIEF DESCRIPTION OF THE DRAWINGS

Embodiments of the present invention will now be described by way of example only, with reference to the accompanying drawings, in which:

FIG. 8 shows an example database for implementing the example game;

FIGS. 10B and 10C show various events pertaining to a game session with control of the game session passing between a master central server and a venue central unit.

DETAILED DESCRIPTION

Figure 1:
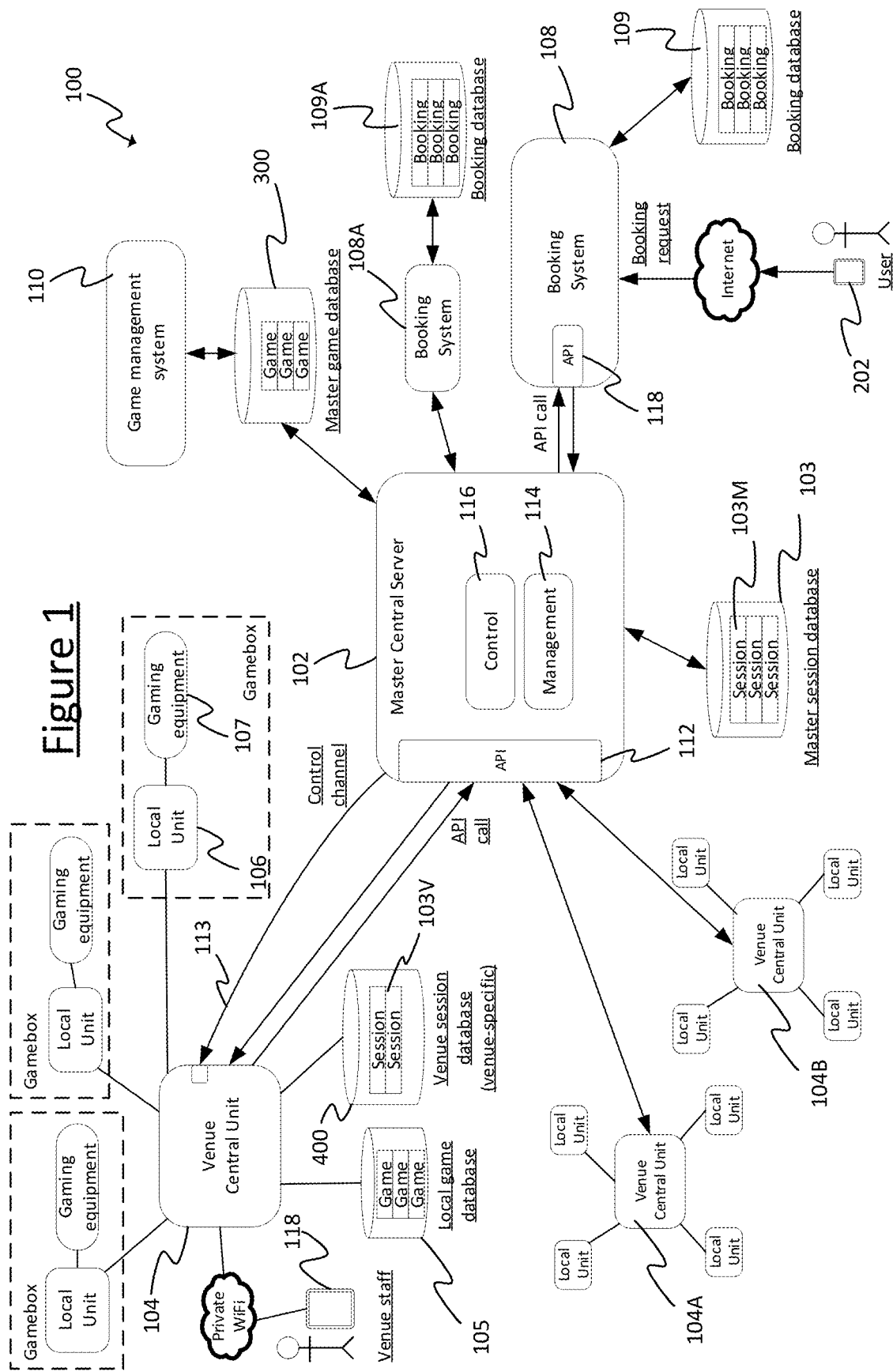
FIG. 1 is a schematic diagram of a distributed computer system.

FIG. 1 shows a distributed system 100 comprising a master central server 102 and multiple venue central units 104, each connected (at least intermittently) to the master central server 102.

Each venue central unit 104 is located at a different venue, and each is shown connected to a plurality of local units located at that venue. A local unit is denoted by reference numeral 106. The venues are geographically distributed, and could even be located in different countries.

The term "server" is used in a broad sense. The master central server 102 could be implemented on a single machine or multiple machines (e.g. in a server pool configuration), which in turn could be physical or virtual. A physical machine comprises at least one processor (e.g. CPU). A virtual machine is still implemented on a physical machine, and multiple virtual machines may be implemented in the same physical machine. In terms of software architecture, the master central server 102 could comprise one or multiple services. The central server 102 is shown to comprise a control system 116 and a management system 114, which denote, at a high level, a division between control functions and management functions, as detailed below. Such functions are ultimately carried out by instructions executed on the underlying physical or virtual machine(s).

The number of local units 106 connected to a respective venue central unit 104 depends on the capacity of the venue. As discussed below, a game experience is provided in an interactive game room ('gamebox' or 'pod') at the venue, with each room having its own respective local unit 106 controlling a sophisticated set of multimedia gaming equipment 107 located in that room. Therefore, the number of local units 106 connected to a specific venue central unit 104 is dependent on the number of game rooms at the venue.

Each venue central unit 104 comprises at least one processor (e.g. CPU) and at least one network interface for connecting to the master central server 102, to each local unit 107, and to at least one venue management device 118, via wired or wireless (e.g. Wi-Fi) network connections. For example, each venue central unit 107 might take the form of a hardware server or server rack located at the venue. Each local unit 106 comprises at least one processor (e.g. CPU) and at least one bus interface (e.g. USB, thunderbolt, PCI etc.) via which it connects to the gaming equipment 107. The later includes components such as image projectors or other display system(s), image capture device(s) and/or other types of sensor, audio output device(s) etc. The venue management device 105 can be a basic consumer device (such as a tablet), which accesses management functions of the venue central unit 104 via a local Web interface or other session management interface provided by the latter (e.g. via a private wireless network of the venue). The described functions are carried out according to program instructions executed on the applicable processor(s).

The master central server 102 is shown connected to a ticketing system 108 (also referred to as a booking system) and a game management system 110.

A booking (or ticket) is created within the ticketing system 108 in response to a booking request in the conventional manner. A benefit of the described architecture is the ability to interface with "off-the-shelf" booking systems. A booking request is typically received from a user device 202, over the public Internet. Bookings are held in a booking database 109 managed by the booking system 108. A booking identifies a requested venue as well as user contact details (e.g. email address, telephone number, messaging identifier, or any other user address) and booking time (arrival time). The booking also includes at least one user address (such as an email address, telephone number, messaging identifier etc.)

However, in contrast to conventional booking systems, once a booking has been created, a detailed game session is generated automatically by the master central sever 102. The game session is stored by the master central server 102 in a master session database 103. As described in more detail below, a second copy of the game session is propagated by the master central server 102 to the applicable venue central unit 104, where it is stored in a venue session database 400 local to that venue (typically, the venue specified in the booking request). The game session includes all details required to load and execute the game at the venue, such as a game identifier, which might identify a particular build of a game, number of players, team name(s) etc. Such details may be specified at the time of the booking request or after the booking has been made.

A first application programming interface (API) 118 is provided by the booking system 108, via which the master central unit 102 obtains details of new bookings or changes to existing bookings.

It is possible for a game session to be derived from multiple bookings. For example, if two users (or groups of users) create bookings with the same arrival time, those users/groups might be paired. One use case would be a game with competing teams, with each team creating their own booking, and the master central server 104 responsible for pairing competing teams.

The central server 102 also has the ability to interface with multiple booking systems. By way of example, a second booking system 108A operating a second booking database 109A is shown.

Reference numeral 103M denotes the copy of a game session in the master session database 103, whereas reference numeral 103V denotes the second copy of that game session in the venue session database 103 of the applicable venue. Although not shown, the second booking system 108A would typically provide its own API that is exposed to the master central server 102 in the same manner.

Initially, the master central server 102 has control of the game session. This means that any changes to the first copy of the game session 103M in the master session database 103 (e.g. caused by a change in the corresponding booking) are propagated to the venue central unit 104 for replication in the venue session database 400, ensuring that the second copy of the game session 103V (venue copy) matches the first copy 103M in the master session database 103. Whilst the master central server 102 has control of the game session, it is still possible for changes to be made to the venue copy 103V. However, those changes are not propagated to the master central server 102 for as long as the latter retains control, and are overwritten by any changes received from the latter. Therefore, for as long as the master central server 102 retains control, the first copy of the game session 103M is the "authoritative" copy.

At a certain point, control of the game session passes from the master central server 102 to the venue central unit 104 at the applicable venue (a set interval before the requested booking time in the present example). For as long as control remains at the venue 104, the venue copy is now the authoritative copy. Changes to the venue copy 104 are now propagated to the master central server 102 for replication in the master session database 103.

If changes made to the venue copy 103V before it assumes control have not been overwritten by the time control passes to the venue central unit 106, then they will be propagated to the master central server 102 at or after that point.

In either direction, changes may be propagated at regular intervals, or only in response to specific events (such as the completion of a game in the cases of changes propagated from the venue to the master central server 102).

Once control has passed to the venue central unit 104, the venue central unit 104 can, in turn, pass control of the game session to one of the local units 106 at that venue (for conciseness, the game session is said to pass from the former to the latter). This entire process is essentially automated, with no or minimal input required from event staff. In the present example, the game session passes from the venue central unit 104 to the local unit 106 in response to a game initiation instruction from the venue management device 118, which could be a "one click-type" action or a similarly straightforward operation. The game session contains all of the details needed by the local unit 106 to load and execute the game, and those details do not need to be entered by the venue staff.

A game management system 110 is provided for managing games across the distributed venues. A master game database 300 holds game applications (with associated metadata, such as game identifiers, game builds etc.), and the master central unit 102 propagates new games and updates to existing games to all of the venue central units 104. Each venue central unit 104 stories its own copies of the games in a local game database 105 so that the game identified in a game session can be loaded onto the applicable local unit 106.

The above-described functions of the master control server 102 fall under the definition of "management" as the term is used herein. Hence, those functions are said to be performed by the management system 114. A second API 112 is provided by the master central server 102, which is exposed to each venue central unit 104. The venue central unit 104 cooperates with the master central server 102, by requesting updates to game session and games via the second API 112. For the most part, each venue central unit 104 requests the information it requires from the management system 114 ('pull' architecture), although certain updates or other information may be 'pushed' to venues instead.

The control system 116 implements somewhat lower-level control functions, such as powering each venue central unit 104 up or down, rebooting etc. A control channel 113 to each venue central unit is provided for this purpose, via which the control system 102 can push control messages to venue central unit 104.

Figure 2:
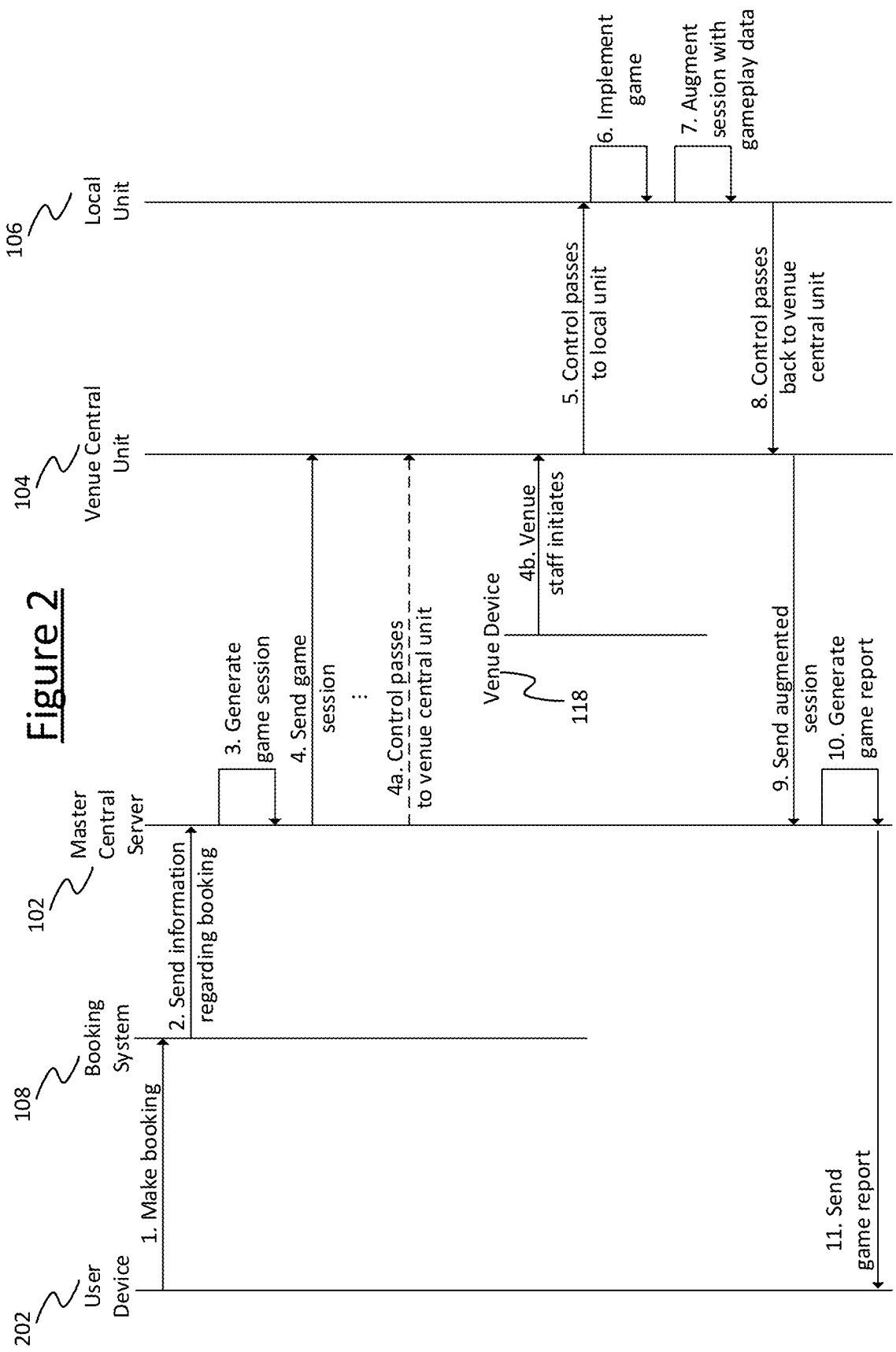
FIG. 2 shows an example signalling diagram to show the creation and propagation of a game session in the distributed system.

FIG. 2 shows a signalling diagram for the propagation of a game session though the distributed system 100.

At step 1, a user makes a booking via the user device 202 with the ticketing system 108. The booking specifies a time, location (i.e. venue), and game. The booking also comprises at least one user identifier, such as a name, email address, and/or telephone number.

The ticketing system 108 receives the booking from the user device 202 and sends the information regarding the booking, comprising at least the time, venue, and game to the master central server 102 at step 2.

The master central server 102 generates, at step 3, a game session in the manner described above. The game session comprises the booking information and game data associated with the game booked by the user.

Further details of the game session are described later.

At step 4, the game session is sent from the master central server 102 to the venue central unit 104. As set out above, the game session comprises a venue (or venue identifier) selected by the user when booking. The game session is sent to the venue central unit 104 of the selected venue.

The venue central unit 104 stores the game session. The game session is sent to the venue central unit 104 as soon as, or shortly after, it is generated. Game sessions may be sent periodically, or continuously at any time the venue central unit 104 is connected to the master central server 102. In the present example, the venue central unit 104 obtains new game sessions and updates to existing game session via regular API calls to the master central server 102.

The venue central unit 104 therefore has the game session prior to the time for which the game was booked. This means that, if the connection to the master central server 102 is lost at the time of the game, the players can still play the game at the selected venue. Thus, the robustness of the system to disruptions across the system is improved, allowing a venue to be used even if it cannot connect to the master central system 102.

At step 4a, control of the game session passes from the master central server 102 to the venue central unit 104. In the present example, this occurs some set time interval before the arrival time specified in the game session. This may or may not involve explicit signalling between the master central server 102 and the venue central unit 104 (as each system knows in advance when control should pass from the former to the latter).

At the time of the game session, control of the game session passes from the venue central unit 104 to the local unit 106 of the room in which the game is to be played, step 5, in response to a game initiation instruction from the venue management device 118 (step 4b). The room could be specified in the game session or assigned by the venue staff. The game session received from the master central server 102 and stored in the venue session database 400 comprises a game identifier of the game to be played, allowing the game to be located in the local game database 105. For example, the game may have been selected at the user device 202 at the time of the booking (with the booking request), or added after the creation of the booking, and stored as part of the game session in the master session database 103. On assuming control of the game session, the local unit 106 loads program instructions of the identified game into memory and delivers a game experience according to those instructions using its set of multimedia gaming equipment 107.

The local unit 106 implements the game at step 6, and augments the game session (currently under its control) with gameplay data associated with game play at step 7. At least some of the game play data would typically be generated as the game is played. The game session may be augmented dynamically as the game is played, or only at the end of the game with the final gameplay data. The local unit 106 implements the game using its set of multimedia gaming equipment 107, such as an image projector, touchscreen, camera, and/or audio output device (or multiple such devices) as described in more detail below. The gameplay data generated is associated with game moves made by the players during the game.

At the end of the game, control of the game session passes back from the local unit 106 to the venue central unit 104, step 8. The gameplay data is stored at the venue local unit 104 in the venue's copy of the game session 103V until it is sent to the master central server 102, step 9. At this point (or some later point before step 10), control of the (now augmented) game session passes pack to the master central server 102.

Augmented game session may be sent from the venue central unit 104 to the master central server 102 in batches periodically/at scheduled times, or each augmented game session may be communicated individually once available.

Once the master central server 102 has received and assumed control of the game session, it generates a game report at step 10. The game report is sent from the master central server 102 to the ticketing system 108 at step 11, which then sends to game report to the user device 202, step 12 (or, more precisely, to the user address or addresses contained in the game session). The game report includes an image of the players captured in the game room at the end of the game (game image), as well as game results such as a game score(s). The game image and game results form part of the data with which the game session is augmented. The augmented game session could also include a recorded video of the game, which may or may not be communicated in the game report.

Figure 10A:
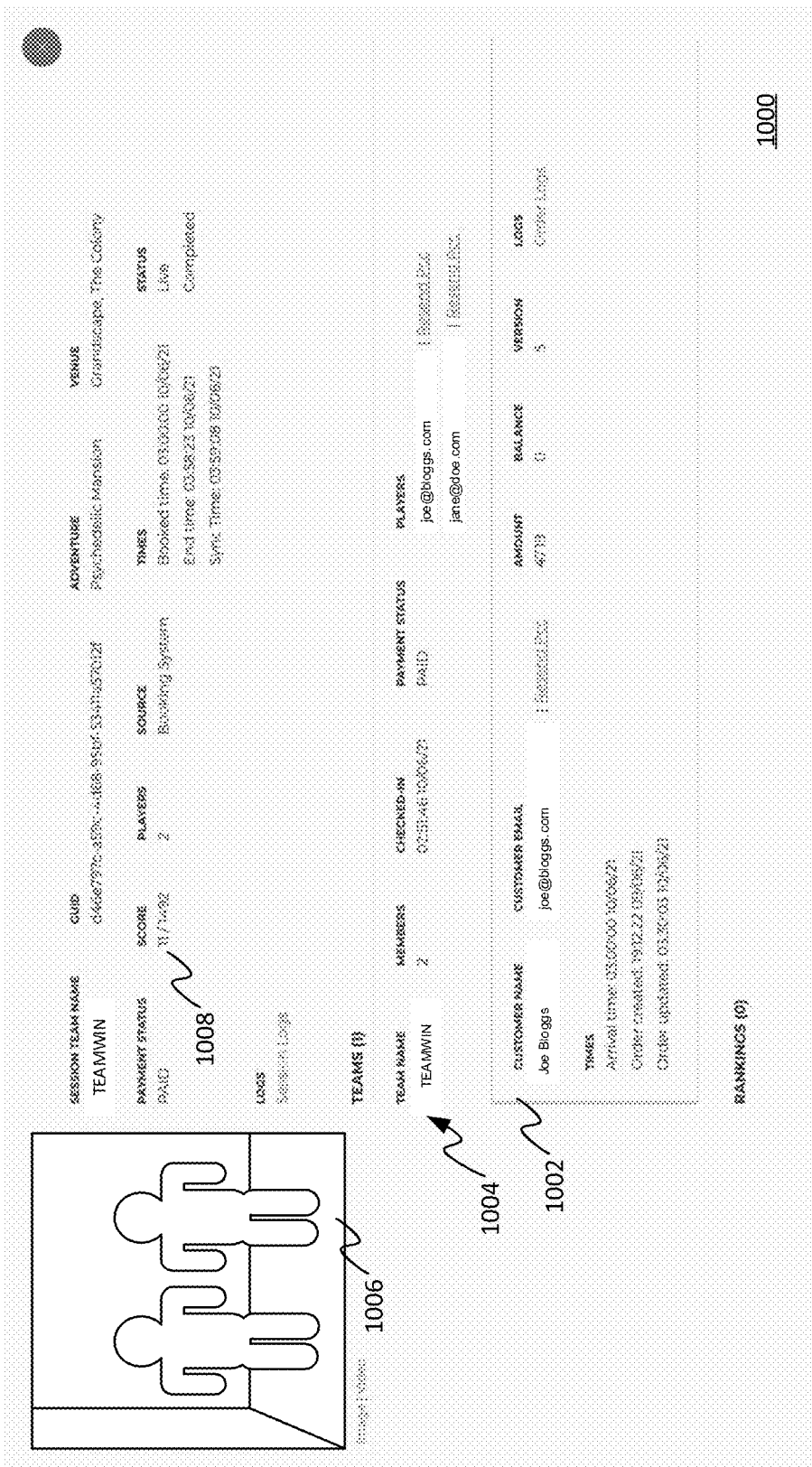
FIG. 10A shows an example of an augmented game session rendered on a session management user interface.

FIG. 10A shows the contents of an example game session 1000. Reference numeral 1002 denotes the contents of the underlying booking from which the game session 1000 has been generated; that is, the contents of the booking in the booking database 109 managed by the booking system 118. The booking information 1002 includes relatively high-level information, including arrival time, customer email address, and payment status and information. This particular game session 1000 has been generated from a single booking; as noted a game session could be generated from multiple bookings.

The additional session data, denoted by reference numeral 1004, does not form part of the booking in the booking database 109, and may not be visible within the booking system 108 at all (although at least some of the information may be captured at the time the booking is made).

The additional session data 1004 includes a team name, number of players, an email address for each player, a game identifier, a venue identifier, a source of the original booking. The game session 1000 is depicted following termination of a game, after it has been augmented with a game image 1006, final player or team score(s) 1008, the exact time the game was played, and a synchronization time at which the augmented game session 100 was synchronized with the master central server 120. The game session is also shown to comprise a unique session identifier, which is a globally unique identifier (GUI) in this example.

The player email addresses allow the game image 1006 to be sent to each player once control of the augmented game session 1000 passes back to the central control server 102.

Figures 10B, 10C:
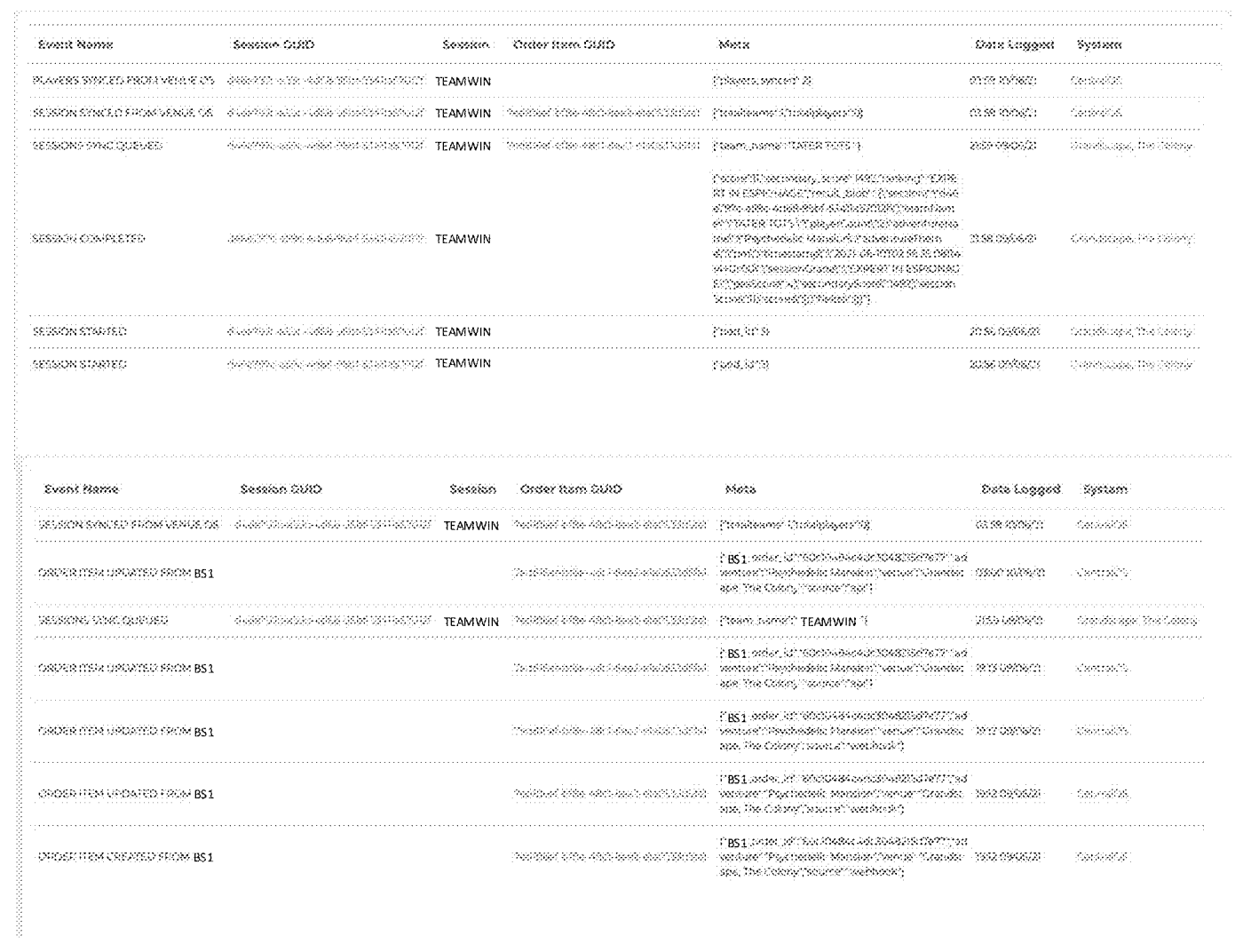

FIGS. 10B and 10C shows example snippets of event logs pertaining to a game session. "CentralOS" denotes control of the game session by the master central server 102 and "Grandscape, The Colony" denotes a specific venue (or, more precisely, denotes control of the game session by the venue central unit 106 of that venue). The manner in which control passes between those two systems 104, 106 is evident.

Separate logs (not depicted) are maintained to associate each game session with the game room in which it was delivered, allowing a session to be traced back to a game pod, and vice versa.

Figure 3:
FIG. 3 is an example game database stored at a master central server.

FIG. 3 shows an example game database 300 accessible to the master central server 102. The game database 300 comprises a set of games, each shown to be associated with a first a second "gameboard" and a first a second rule set. The first rule set is associated with the first gameboard and the second game set with the second gameboard. It will be appreciated that each game may be associated with a different number of gameboards. The term "gameboard" used in a broad sense herein to mean a set of interactive game elements and associated rules embodies in game code, and does not imply any particular structure or format to the game.

Although not shown in FIG. 3, each gameboard entry of the game database 300 comprises a code for rendering the gameboard in a game room. Each rule set comprises a set of rules for implementing the game on the associated gameboard.

When generating the game session, the master central server 102 accesses the game database 300 and extracts the gameboards and rules sets associated with the user selected game. These are then added to the game session.

In order to implement changes or updates in an existing game and/or provide a new game, the game database 300 is updated. An administrator accesses the game database 300 via a computer device and updates the database 300 accordingly. Access to the database 300, in particular write access, may be restricted such that only the administrator can amend the game database 300. Games may be deleted in a similar way.

Since the game database 300 is held at the master central server 102, via which all game session are generated, games are updated and/or introduced across all venues at the same time and in the same way. This means that fewer personnel are required on-site and changes are consistent in all venues. Therefore, game updates are implemented in a time and resource efficient manner.

Figure 4:
FIG. 4 is an example venue game session database stored at a venue central unit.

FIG. 4 shows an example venue database 400 stored at the venue central unit 104 sorting the game sessions. The venue database comprises a time filed, a room field, a session ID field, a gameboards field, and a game rule sets field. Each received game session defines data for each of the fields.

In order to deliver the game experience to the user in the game room, the game session is sent from the venue central unit 104 to the local unit 106 of the game room. This may be automatically sent, for example, when the time in the time field is reached, the game session is sent to the local unit as defined in the room field. Alternatively, the sending of the game session may be manually activated. For example, a venue attendant may access a computer device connected to the venue central unit 104 and request the game session to be sent to the local unit 106. Some restrictions may apply for manual activation, for example the game session may only be sent within a 5 minute window either side of the time in the time field.

In some embodiments, the venue central unit 104 does not send the whole game session to the local unit 106. Instead, the game session sends the gameboards and the rules sets of the user selected game as identified in the game session, but does not send, for example, the time or the room as identified in the game session. Herein, the term game session refers to the data required to implement the game, and may also include additional information to aid in scheduling.

Figure 5:
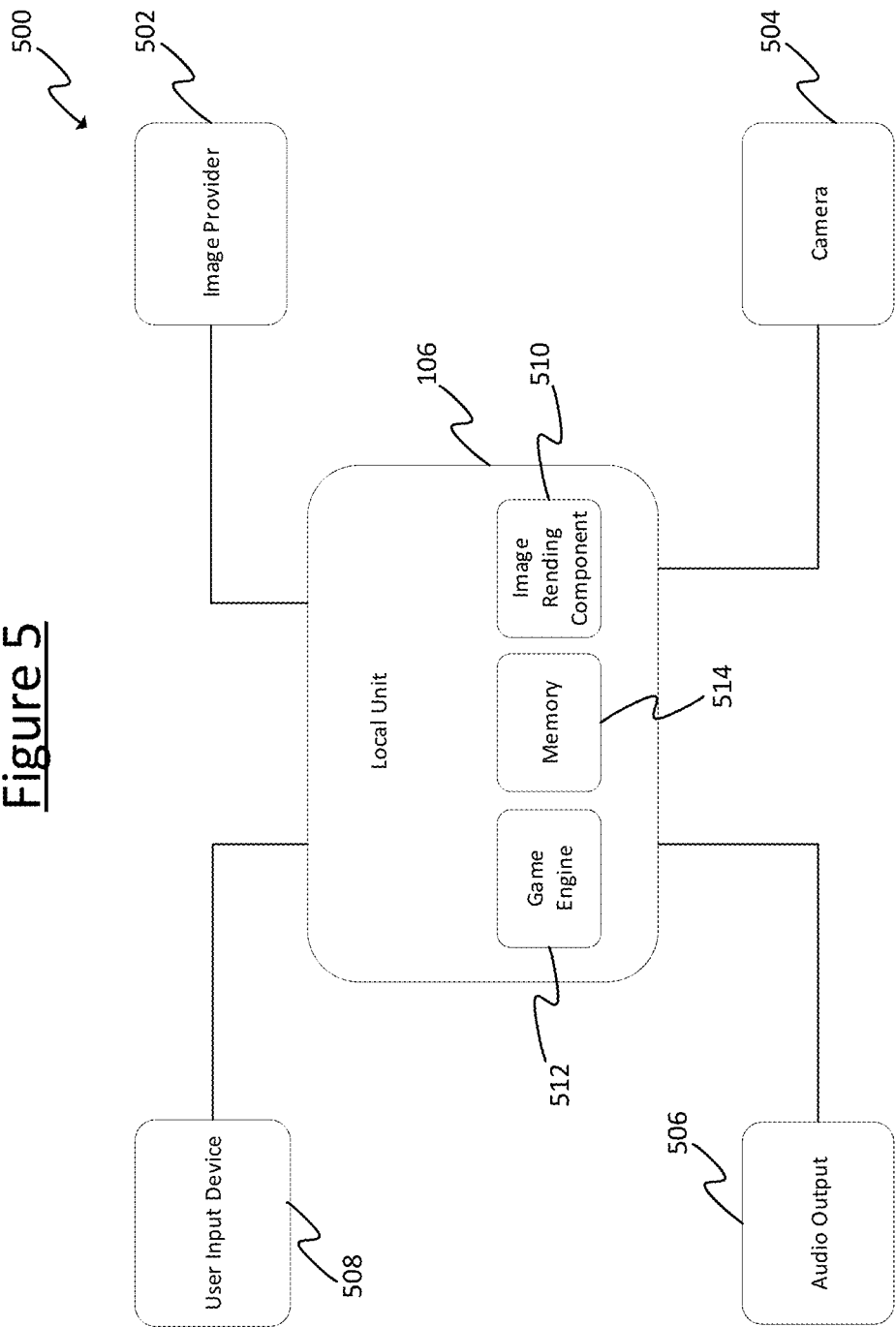
FIG. 5 is a schematic diagram of a local system for implementing a game experience.

FIG. 5 is an example room system 500. The room system 500 is located in the game room and comprises the local unit 106, an image provider 502, a camera 504, an audio output device 506, and a user input device 508. The image provider 502, camera 504, audio output device 506, and user input device 508 may be referred to herein as game delivery devices and are user to deliver the game experience to the user. The game delivery devices 502, 504, 506, 508 are connected to the local unit 106.

The local unit 106 comprises a game engine 512, an image rending component 510, and a memory 514. During game play, the image rendering component 510 renders an image for display on a display screen, which is passed to the image provider 502 for providing on the display screen.

The user provides an input associated with the displayed image via the user input device 508. The game engine 512 receives the input and determines an action to be triggered based on the input. The game engine 512 accesses the memory 514 in which the game rules sets are stored in order to determine the action. The game engine 512 updates the image based on the triggered action and provides the updated image to the image rending component 510 for rending.

The game engine 512 may also determine sounds to be provided to the user based on the gameboard and/or the game rules, which it provides to the audio output 506.

In some embodiments, a location of the user within the game room is used to trigger actions. The camera 504 generates images of the user, which are analysed by the local unit 106 in order to determine a location of the user in the room. This location is used by the game engine 512 to determine the action to trigger.

Figure 6:
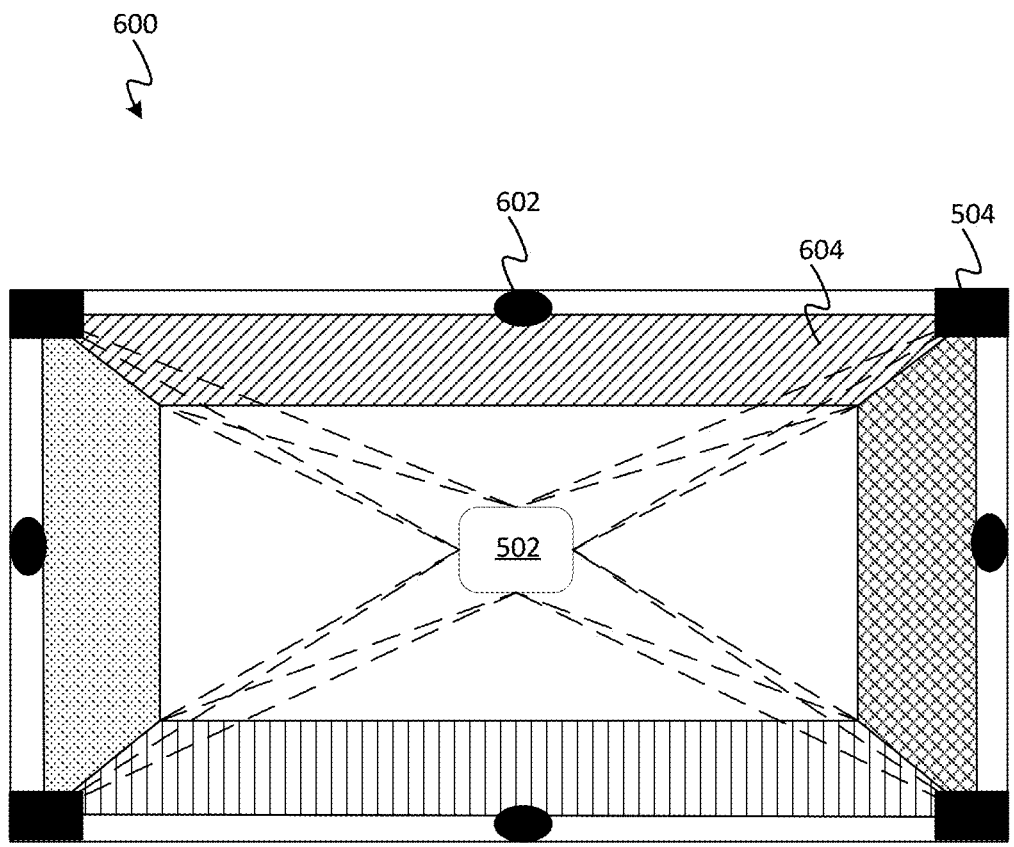
FIG. 6 is a schematic diagram of a game room.

FIG. 6 shows an interactive game room 600 comprising four touchscreens, one on each of the four walls of the interactive room 600. In some instances, touchscreen 100 may be provided on only some of the walls of the room 600. The touchscreen may not actually be located on the wall, as the term refers more generally to an input device(s) for detecting touch input at the wall (including touchscreen frames or sensor(s) providing similar touch detection functionality without the use of a touchscreen panel).

The game room 600 also comprises cameras 504 in each upper corner of the room. These cameras 504 capture images of the user, which are used by the game engine to determine the location of the user in the room 600. A combination of touch input and motion capture is used to control the game, with users moving within the room and touching the walls to control game elements.

During gameplay, the image is displayed on the display plane 604. The image corresponds to the game experience, and provides user selectable elements which, when selected by a user, result in the action being triggered.

The images provided to the display planes 604 of the room 600 correspond to the same interactive environment.

For example, the gameboard may cover some or all of the four display planes 604 of the room 600.

Figure 7:
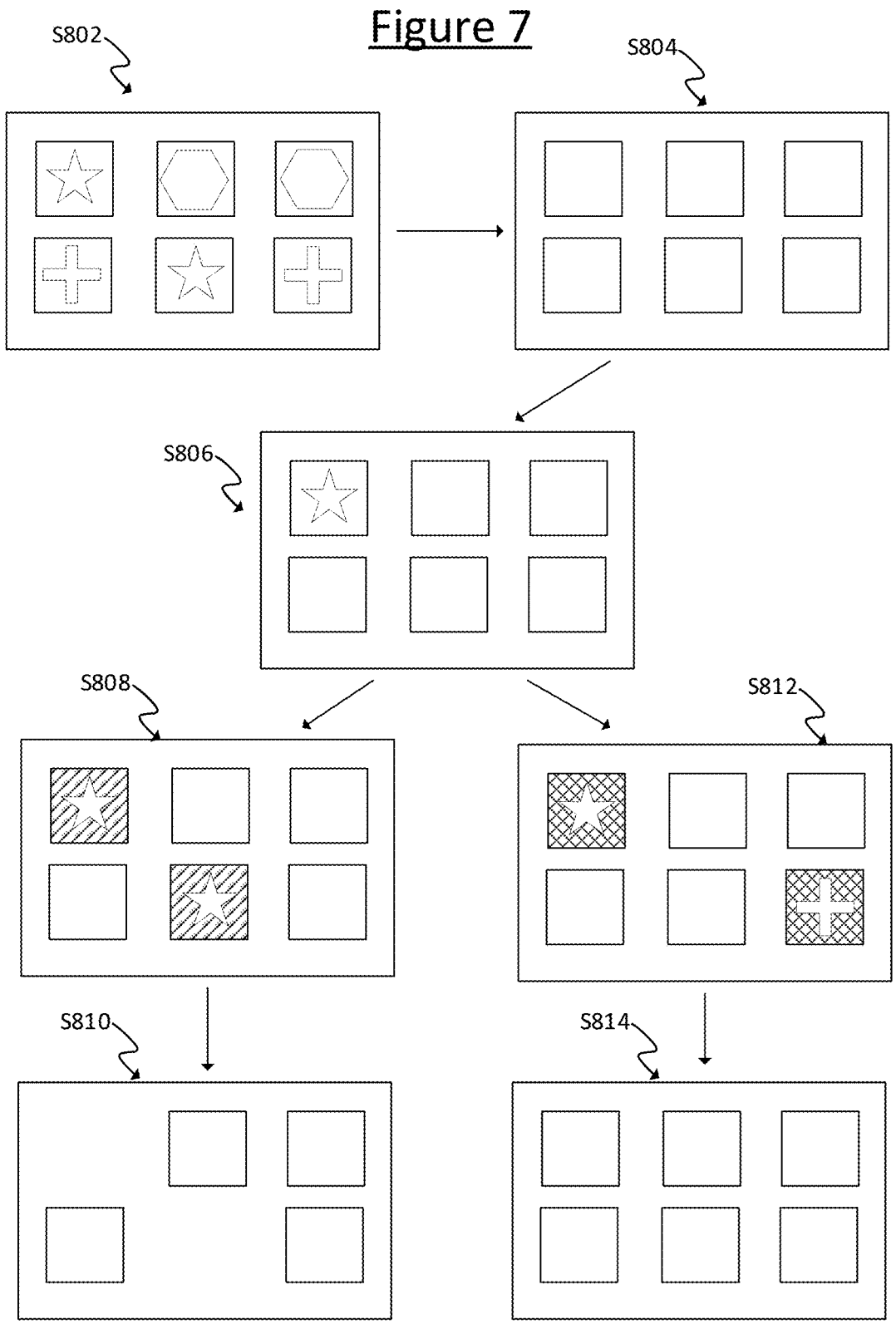
FIG. 7 shows an example game which may be implemented by the system.

FIG. 7 shows an example game which may be implemented on the game environment. FIG. 8 shows an example game rule database 700 which may be used when providing the game environment of FIG. 7.

At step S802, an image is displayed on the display plane 604 with a number of cards, each card showing a shape. In the example for FIG. 7, six cards are shown, with each card having either a star, a hexagon, or a cross. Two of the six cards have each of the three shapes.

At step S804, a new image is displayed on the display plane 604 in which the cards have been reversed such that the user can no longer see the shapes. The aim of the game is for the user to pair up matching cards from memory.

The user selects a first card by providing a user input at the location of the display plane 604 at which the first card is displayed.

The game engine accesses the game rules database 900 to determine the action to be triggered. Since the user has selected a first card, the triggered action is to turn over the selected card. The image is updated to display the first card shape side up, showing a star, and the updated image is displayed on the display plane 604, step S806.

The user selects a second card by providing a user input at the location of the display plane 604 at which the second card is displayed. Again, the game engine accesses the game rules database 900 to determine the action to be triggered.

If the user has selected the card matching the first card, in this example the other card with a star, the triggered action is turning the second selected card over, changing the colour of both of the now selected cards to green, and removing the cards from the game environment.

The image is updated based on the triggered action and displayed on the display plane 604. In the example of FIG. 7, the actions are triggered in two stages.

At the first stage, the second card is turned over and both cards are shown in green, step S808. At the second stage, the cards are removed, step S810. It will be appreciated that each of the actions associated with the selected element may be implemented in separate steps, in a single step, or in any combination of steps.

If, instead, the user has selected a card which does not match the first card, in this example a card with a cross, the triggered action is turning the second selected card over, changing the colour of both of the now selected cards to red, and turning both cards back over so that no shape is visible to the user.

The image is updated based on the triggered action and displayed on the display plane 604. In the example of FIG. 7, the actions are triggered in two stages.

At the first stage, the second card is turned over and both cards are shown in red, step S812. At the second stage, the cards are turned back over, step S814.

The game rule database 900 also comprises a score associated with the selected element. During game play, a game score may be calculated by the game engine based on these scores. For example, when the user selects a first card, there is no change in score; if the user selects a matching card, the score increases by 10 points; and if the user selects a non-matching card, the score decreases by 5 points.

The game engine updates the game score with each user selection.

At the end of the game, the gameplay data, including for example the game score(s) is sent to the master central server 102 as set out above.

Figure 9:
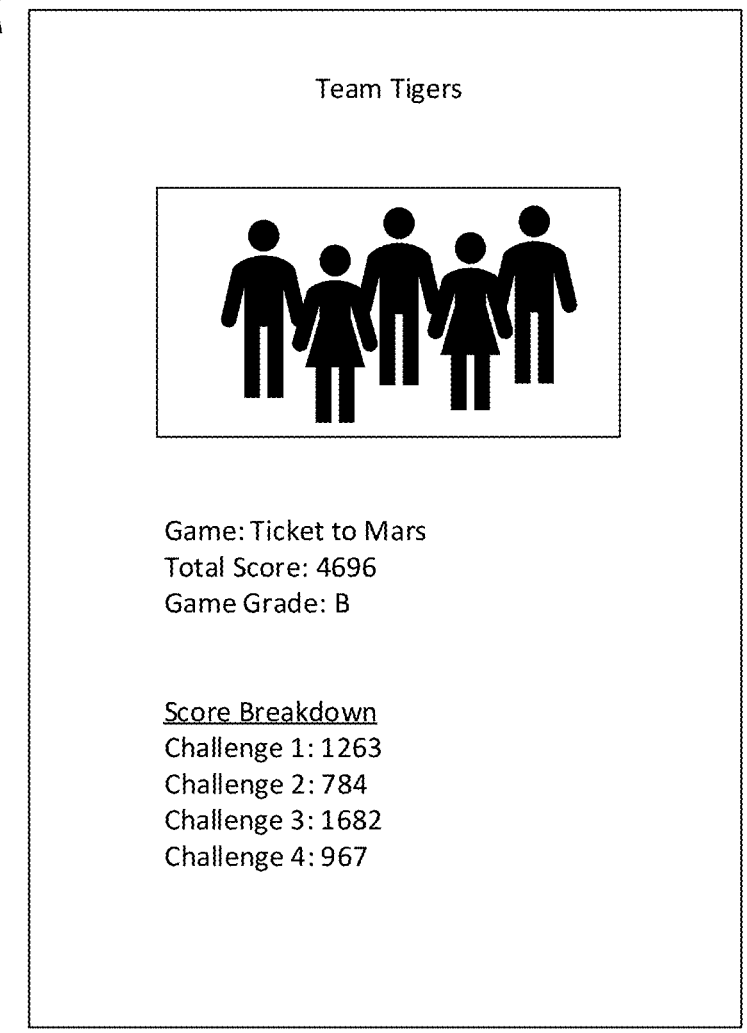
FIGS. 9 and 9A shows examples of possible game reports.
Figure 9A:
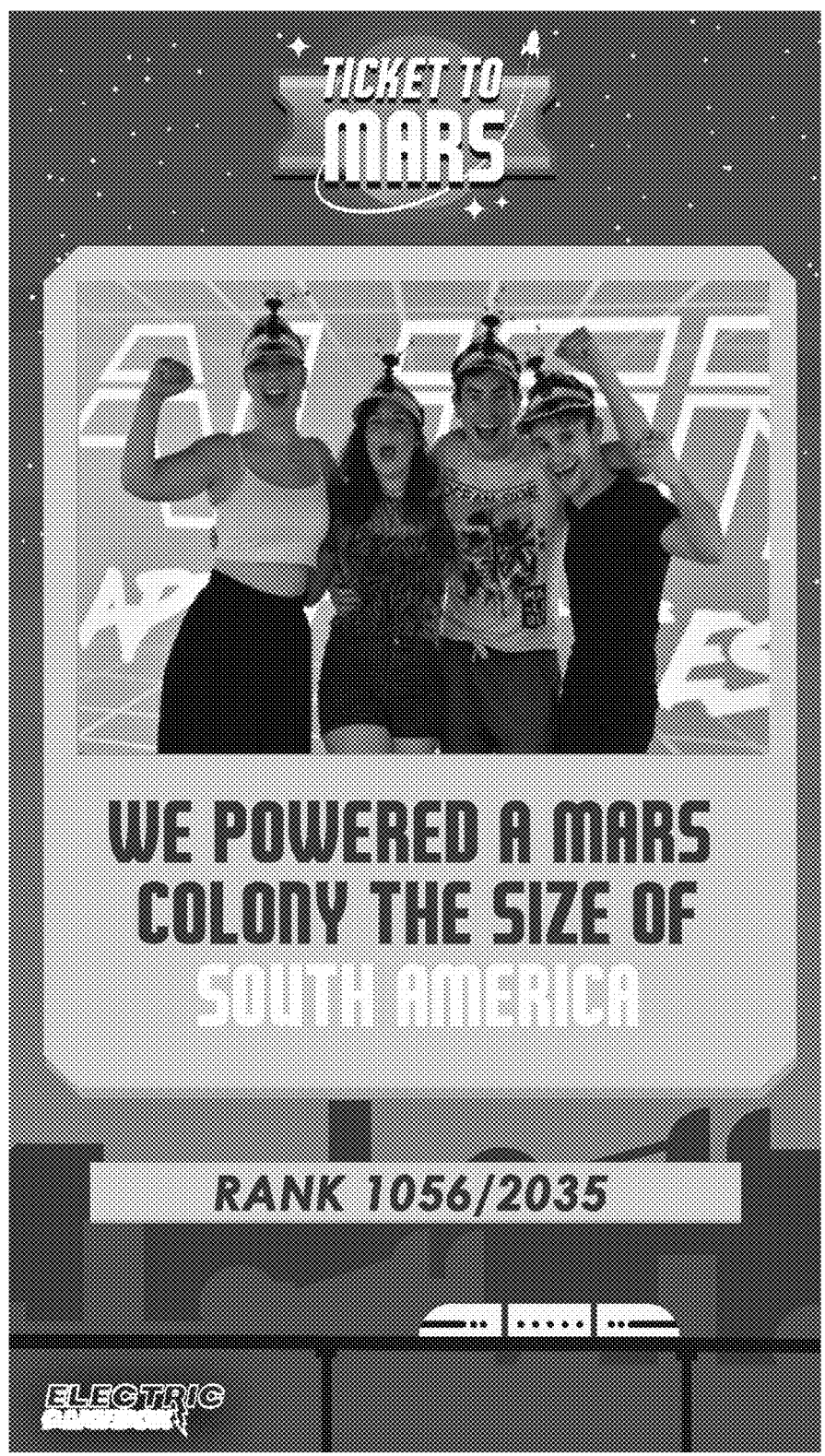

FIGS. 9 and 9A show examples of possible game reports 950,920 generated by master central server 102. The game report comprises an image of the players captured by the camera 504 of the game room 600. The game report comprises information from the gameplay data, such as a total game score, a game score for each challenge, a game grade, and the game. The game report 950,952 may comprise other information such as a user defines team name.

The game report 950,952 is provided to the user device. For example, the game report 950,952 may be sent via email to an email address of the user provided on booking the game. The game report 950,952 may be sent from the master central server 102 directly to the user device 202, or it may first be sent to the ticketing system 108, which sends the report 950,952 to the user device 202.

In general, data may be communicated between the components of the of the distributed system 100 may be sent using a "push" architecture, a "pull" architecture, or a combination thereof. For example, the venue central units 104 may request any recent game sessions generated, such that the game sessions are pulled by the venue central unit 104. The venue central unit 104 may also push game session to the local unit 106 at the appropriate time or when manually affected.

The invention claimed is:

1. A distributed computer system for delivering a requested game experience at any venue of a plurality of distributed venues, the distributed computer system comprising:
   at each venue: a plurality of local units serving respective gameplay areas of the venue, each local unit coupled to a set of multimedia gaming equipment for delivering a game experience in its gameplay area, and a venue central unit configured to connect to each of the local units of that venue;
   a booking system for managing game bookings across the plurality of distributed venues, the booking system configured to receive, from a user device via a public network, a booking request denoting a requested venue of the plurality of distributed venues, and create a booking in response; and
   a master central server configured to connect to the booking system and the venue central unit of each venue;
   wherein the master central server is configured to generate a game session based on the booking, and automatically communicate the game session to the venue central unit of the requested venue, wherein the game session comprises details required by the local unit to load and execute the game at the venue, wherein the venue central unit receiving the game session is configured to render accessible, to the local unit serving one of the gameplay areas, game details of the game session, and wherein that local unit is configured to deliver the requested game experience within that gameplay area, using its set of multimedia gaming equipment, based on the game details of the game session;
   wherein the venue central unit is configured to store the game session in a venue session database of the requested venue, and wherein the master central server is configured to duplicate the game session in a master session database.

2. The distributed computer system according to claim 1, wherein the master central server is configured to retain control of the game session initially and, whilst in control of the game session, propagate any changes to the game session to the venue central unit of the requested venue for replicating in the venue session database;

wherein, responsive to a venue control event, the venue central unit is configured to assume control of the game session, and, whilst in control of the game session, propagate any changes in the game session to the master central server for replicating in the master session database.

3. The distributed computer system of claim 2, wherein the local unit is configured to augment the game session with gameplay data, wherein the venue central unit is configured, whilst in control of the game session, to pass control of the game session to the local unit in response to a game initiation event, wherein the local unit is configured to: initiate the game experience responsive thereto, augment the game session with gameplay data whilst in control of the game session, and pass control of the augmented game session back to the venue central unit upon termination of the game experience.

4. The distributed computer system of claim 3, wherein the venue central unit is configured to automatically communicate the augmented game session to the master central server, wherein the master central server is configured to store the augmented game session in the master session database and assume control of the augmented game session thereafter.

5. The distributed computer system of claim 3, wherein the game initiation event is the receipt of a game initiation instruction at the local unit from a venue management device.

6. The distributed computer system of claim 2, wherein the venue control event is the expiration of a time limit set by a booking time of the booking session.

7. The distributed computer system of claim 2, wherein the booking system is configured to store the booking in a booking database, wherein the master central server is configured, whilst in control of the game session, to modify the game session in the master database based on a change in the booking, and communicate the modified game session to the local unit for storing in the venue session database.

8. The distributed computer system of claim 1, wherein the local unit is configured to augment the game session with gameplay data.

9. The distributed computer system of claim 8, wherein the venue central unit is configured to automatically communicate the augmented game session to the master central server.

10. The distributed computer system of claim 9, wherein the game session comprises at least one user address, and the master central server is configured to automatically send at least a portion of the gameplay data from the augmented game session to the user address.

11. The distributed computer system of claim 10, wherein the portion of the gameplay data of the augmented game session comprises image data captured by the local unit from the gameplay area during the gameplay experience.

12. The distributed computer system of claim 1, wherein each venue central unit has a session management interface, wherein the venue central unit of the requested venue is configured to initiate the delivery of the game experience by the local unit in response to a game initiation instruction received at the session management interface.

13. The distributed computer system of claim 12, wherein the session management interface is accessible to a venue management device via a private network of the venue, the game initiation instruction received from the venue management device via the private network.

14. The distributed computer system of claim 12, wherein the game initiation instruction denotes the gameplay area to which the gameplay session is to be transferred, or the game session comprises an identifier of the gameplay area which the gameplay session is to be transferred.

15. The distributed computer system of claim 1, wherein the master central server is configured to access the booking via a first application programming interface of the booking system, wherein the master central server is configured to provide a second application programming interface, accessible to each of the venue central units, via which the game session is communicated.

16. The distributed computer system of claim 15, wherein the master central server comprises a control system for controlling operations of the venue central unit via control messages sent via push channels from the central server to the venue central units.

17. The distributed computer system of claim 1, comprising a game management system for creating and/or modifying games held in a master game database, wherein the master central server is configured to automatically communicate a new or updated game to all of the venue central units, wherein each venue central unit is configured to store a venue copy of the central game database, wherein the game details of the game session identifies one of the games and the game experience is delivered by executing the identified game on the local unit.

18. The distributed computer system of claim 1, wherein each set of multimedia gaming equipment comprises:
a display system configured to render a real or virtual moving image on at least one display screen in the gameplay area,
at least one input device for receiving user input,
wherein each local unit is configured to update the real moving image responsive to the user input in order to deliver the game experience.

19. The distributed computer system of claim 18, wherein the at least one input device comprises:
at least one image capture device for tracking user motion detected in the gameplay area, the user input comprising user motion detected in the gameplay area, and/or
at least one touch detection device for detecting touch input at the display screen, the user input comprising tough input detected at the display screen.

* * * * *